United States Patent [19]

Pierce

[11] Patent Number: 5,188,783
[45] Date of Patent: Feb. 23, 1993

[54] METHOD OF MAKING ARTICLES CONTAINING AN ION-CONDUCTIVE POLYMER

[75] Inventor: Brian M. Pierce, Moreno Valley, Calif.

[73] Assignee: Hughes Aircraft Company, Los Angeles, Calif.

[21] Appl. No.: 481,546

[22] Filed: Feb. 20, 1990

[51] Int. Cl.$^5$ .................... B29C 43/02; B29C 45/00
[52] U.S. Cl. .................... 264/104; 264/129; 264/518; 264/521
[58] Field of Search ............... 264/104, 129; 252/518, 252/521

[56] References Cited

U.S. PATENT DOCUMENTS

| | | | |
|---|---|---|---|
| 3,846,223 | 11/1974 | Lederman et al. | 264/104 |
| 4,362,680 | 12/1982 | Kobayashi et al. | 264/104 |
| 4,532,169 | 7/1985 | Carley | 264/108 |
| 4,612,149 | 9/1986 | Iseler et al. | 264/101 |
| 4,622,266 | 11/1986 | Kim | 264/331.11 |
| 4,622,354 | 11/1986 | Iseler et al. | 523/527 |
| 4,670,511 | 6/1987 | Weddigen et al. | 525/138 |
| 4,855,077 | 8/1989 | Shikinami et al. | 252/518 |
| 4,935,164 | 6/1990 | Wessling et al. | 525/191 |

FOREIGN PATENT DOCUMENTS 61-149329  7/1986  Japan .................... 264/104

OTHER PUBLICATIONS

"Materials for the New Batteries", by J. W. Braithwaite, Advanced Materials and Processes, Apr. 1987, pp. 67-73.
"Polymers and Composites that Conduct Electricity", by A. J. Klein, Advanced Materials and Processes, Jan. 1986, pp. 28-33.
"Conductive Composites Past, Present, and Future", by R. Crossman, Polymer Engineering and Science, Mid-Jun., 1985, vol. 25, No. 8, pp. 507-513.
"Polyethers as Solid Electrolytes", by M. B. Armand et al., Fast Ion Transport in Solids, Electrodes, and Electrolytes Proceedings Int'l Conf., ed. by P. Vashishta et al., pp. 131-136 (1979).
"Lithium Fast-Ion Conductors: Polymer-Based Materials", by J. Wasson, Office of Naval Research, Contract N00014-83-C-0440, Final Report, May 30, 1987.
"Directions in Automotive Materials", by Jack Simon, Advanced Materials and Processes, Inc., Metal Progress, Jan. 1988, pp. 63-65.
"Fast Ionic Transport in Solids", by J. B. Bates and G. C. Fanington, eds., North-Holland, New York, 1981.
"Materials in Action", Advanced Materials and Processes, p. 24 (May, 1989).
"Materials for the New Batteries", by J. W. Braithwaite, Advanced Materials and Processes, Apr. 1987, pp. 67-73.
"Polymers: Exotic Composite Materials", by H. H. S. Javadi, Microwave Journal, (Feb. 1989), pp. 162-164.
"Highly Electronconductive Polypyrrole Composites", by V. Bocchi, G. Gardini, and S. Rapi, J. Materials Science Letters, 6, (1987), 1283-1284.
"Solid Ionic Conductors", by D. F. Shriver and G. C. Farrington, C&EN, May 20, 1985, pp. 42-57.
"Lithium Ion Conducting Polymeric Hybrids", by E. Isuchida and K. Shigehara, Mol. Cryst. Liq. Cryst., 1984, vol. 106, pp. 361-369.
"Ionic Conductivity and Mobility in Network Polymers from Poly (Propylene Oxide) Containing Lithium Perchlorate", by M. Watanabe, K. Sanui, N. Ogata, T. Kobayashi, and Z. Ohtaki, J. Appl. Phys., 57(1), Jan. 1, 1985, pp. 123-128.

(List continued on next page.)

*Primary Examiner*—Jan H. Silbaugh
*Assistant Examiner*—Brian J. Eastley
*Attorney, Agent, or Firm*—Michael W. Sales; Wanda K. Denson-Low

[57] ABSTRACT

An ion-conductive article and method of making the same. A charge material is formed that includes an ion-conductive polymer and a generally non-ion-conductive polymer. The charge material is fabricated into an ion-conductive article.

17 Claims, 1 Drawing Sheet

OTHER PUBLICATIONS

"Synthesis of Ionic Conducting Interpenetrating Polymer Networks", by C. K. Chiang, B. J. Bauer, R. M. Briber, and G. T. Palls, Office of Naval Research, Contract N00014-86-70020, Task No. 14339, Technical Report No. 5, Aug. 14, 1986.

"Materials Pace Aerospace Technology", by J. J. De-Luccia, R. E. Trabocco, J. Waldman, and J. F. Collins, Advanced Materials & Processes, pp. 39-50 (May, 1989).

"Dielectric Studies of Poly (Ethylene Oxide)-Based Polymer Electrolytes Using Time-Domain Spectroscopy", Solid State Ionics, 28-30, pp. 936-940 (1988).

Promotional Literature for Report entitled: "Conducting Polymers: Opportunities for Making Them, Potential for Using Them, Thread to Conventional Materials".

"Wings of Fire", by Glenn Zorpette, published in Los Angeles Times.

"Plastics that Conduct Electricity", by R. B. Kaner and A. G. MacDiarmid, Sci. Am., pp. 106-111, Feb. 1988.

*McGraw-Hill Encyclopedia of Science & Technology*, vol. 6, pp. 250-252, (6th Ed., 1987).

*McGraw-Hill Encyclopedia of Science & Technology*, vol. 14, pp. 35-40, 142-144, (6th Ed., 1987).

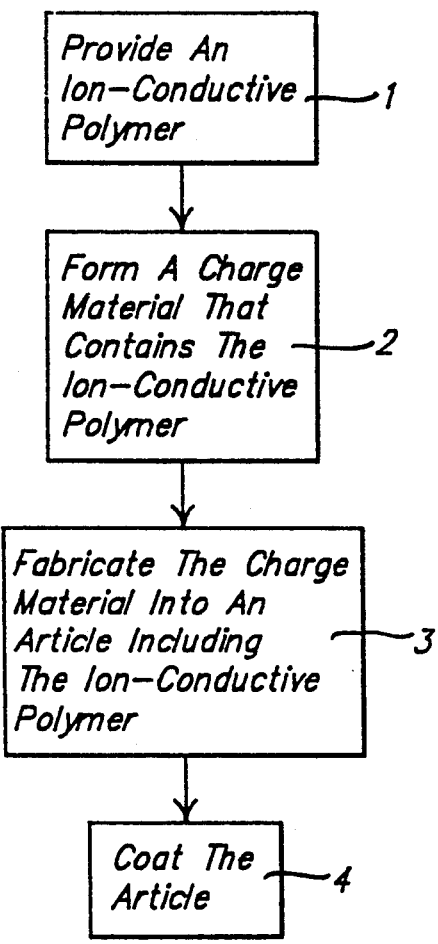
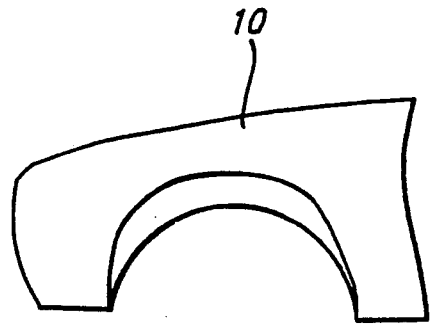
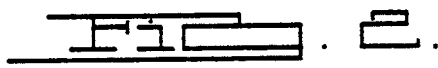
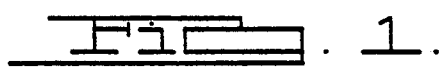
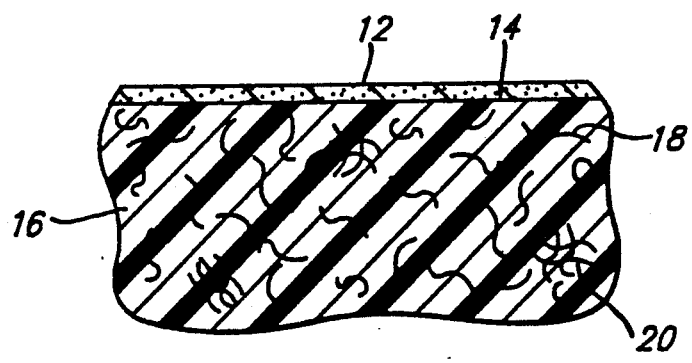
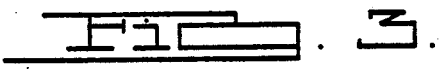

METHOD OF MAKING ARTICLES CONTAINING AN ION-CONDUCTIVE POLYMER

BACKGROUND OF THE INVENTION

1. Field of the Invention

The present invention relates to conductive polymers, and more particularly to composite articles incorporating ion-conductive polymers.

2. Description of the Related Art

In recent years there has been an increased demand placed on materials manufacturers and suppliers to develop relatively non-corrosive, strong, and lightweight materials for use as structural members and panels. For instance, in the transportation industry, emphasis has been placed on the use of materials such as plastics, and plastic-matrix composites, in applications requiring reduced vehicle weight and improved corrosion resistance.

As compared with many metals, however, plastic materials suffer some disadvantages. One such disadvantage is the difficulties encountered when coating plastic articles for decorative or functional purposes. In general, it is difficult to achieve relatively good adhesion of many coatings to plastic articles. Relatively high quality surface finishes on coated plastic surfaces are also difficult to obtain using many ordinary coating compositions and methods.

Electrostatic coating compositions and methods have been proposed as a solution to the surface adhesion and finish problems of many coated materials. Unfortunately, electrostatic coating methods, such as those disclosed in the *McGraw-Hill Encyclopedia of Science & Technology*, Vol. 6, pp. 250-252 (6th ed. 1987) (hereby expressly incorporated by reference) tend to be useful in a limited number of practical applications. For instance, many plastic materials are undesirable candidates for employment with electrostatic coating compositions and methods.

Another disadvantage of many plastic materials is that, in general, plastic materials are undesirable for protecting underlying articles from some of the consequences of natural phenomena, such as being struck by lightning, or excessive amounts of electromagnetic interference. That is, the generally non-conductive nature of many plastics tends to inhibit the desired disbursement of charge (such as from a lighting bolt) over a surface. Such disbursement of charge is important to protect underlying articles from the direct and indirect effects of an excessive charge buildup. The use of metal foils for lightning protection and electric shielding of composite aircraft structures is suggested in "Materials in Action", Advanced Materials and Processes, p. 24 (May, 1989).

It has been suggested that electron-conductive polymers be employed to make articles somewhat conductive. Two presently popular types of electron-conductive polymers that have potential for some commercial applications are polyheterocyclic cations and polyacetylenes. Polyheterocyclic cations, e.g., polypyrrole, are generally resistant to oxidation and have relatively moderate electrical conductivities. However, such materials generally have poor mechanical and processing properties. Polyacetylenes, in turn, have relatively high electrical conductivities when doped, but tend to have relatively poor stability in air. Recently, conductive polymers have received increased attention in the literature as exemplified by the following references, which are hereby expressly incorporated by reference.

"Materials for the New Batteries", by J. W. Braithwaite, Advanced Materials and Processes, Apr. 1987, pp. 67-73 discloses polymer electrolytes for use in batteries.

"Polymers: Exotic Composite Materials", by H. H. S. Javadi, Microwave Journal (Feb., 1989) pp. 162-164 discloses polyaniline conducting polymers that are doped (protonated) to impart conductivity, and are particularly useful for microwave attenuators and terminations.

"Highly Electroconductive Polypyrrole Composites", by V. Bocchi, G. Gardini, and S. Rapi, J. Materials Science Letters 6 (1987) 1283-1284 discloses ferrite salt additions to polypyrrole to improve conductivity.

"Polymers and Composites that Conduct Electricity", by A. J. Klein, Advanced Materials & Processes, Jan. 1986, pp. 28-33 discloses the addition of dopants, fillers or special heat treatments to impart electrical conductivity to a polymer.

"Conductive Composites Past, Present, and Future", by R. Crossman, Polymer Engineering and Science, Mid-June, 1985, Vol. 25, No. 8, pp. 507-513, discloses conductive plastics and polymer composites.

"Solid Ionic Conductors", by D. F. Shriver and G. C. Farrington, C&EN, May 20, 1985, pp. 42-57 discloses polymeric solid electrolytes and applications therefore such as for use as electroytes in solid-state batteries.

"Polyethers as Solid Electrolytes", by M. B. Armand, J. M. Chabagno, M. J. Duclot, in *Fast Ion Transport in Solids, Electrodes and Electrolytes Proceedings International Conference*, edited by P. Vashishta, J. N. Mundy, and G. K. Shenoy, eds., pp. 131-136 (1979), discloses the effect of temperature on polyethers as solid electrolytes as well as on poly (ethylene oxides) and poly (propylene oxides) as adducts with selected alkali metal salts.

"Lithium Ion Conducting Polymeric Hybrids", by E. Isuchida and K. Shigehara, Mol. Cryst. Liq. Cryst., 1984, Vol. 106, pp. 361-369 discloses preparation of plastic solid electroytes from inorganic lithium salts and polymer matrices.

"Ionic Conductivity and Mobility in Network Polymers from Poly (Propylene Oxide) Containing Lithium Perchlorate", by M. Watanabe, K. Sanui, N. Ogata, T. Kobayashi, and Z. Ohtaki, J. Appl. Phys. 57(1), Jan. 1 1985, pp. 123-128 discloses ionic conductivity and mobility in amorphous network polymers from poly (propylene oxide) containing lithium perchlorate.

"Lithium Fast-Ion Conductors: Polymer-Based Materials", by J. Wasson, Office of Naval Research, Contract N00014-83-C-0440, Final Report, May 30, 1987 discloses lithium-containing materials (particularly polymers) exhibiting improved ambient temperature ionic conductivities. Metal salt doped polymers including poly (ethylene oxide) and poly (vinyl acetate) and poly acrylonitride are also discussed.

"Synthesis of Ionic Conducting Interpenetrating Polymer Networks", by C. K. Chiang, B. J. Bauer, R. M. Briber, and G. T. Palls, Office of Naval Research, Contract N00014-86-70020, Task No. 14339, Technical Report No. 5, Aug. 14, 1986 discloses epoxy and ion conducting poly (ethylene oxide)-salt complexes for interpenetrating polymer networks. The epoxy discussed forms a phase with good mechanical properties, while the ionic polymer provides for conductivity.

"Materials Pace Aerospace Technology", by J. J. DeLuccia, R. E. Trabocco, J. Waldman, and J. F. Collins, Advanced Materials & Processes, pp. 39–50 (May, 1989) discloses the use of conductive polymers in applications such as control devices or batteries.

"Directions in Automotive Materials", by Jack Simon, Advanced Materials and Processes, Inc., Metal Progress, Jan. 1988, pp. 63–65, discloses in-mold coating of sheet molding compound body panels with conductive (filled) thermoset polyester coatings.

U.S. Pat. No. 4,532,169 issued Jul. 30, 1985 (Carley) discloses molding an electrically conductive surface into a composite material to enchance electrostatic paintability of plastic parts (see e.g., Column 2).

All percentages herein refer to weight percent unless otherwise indicated.

SUMMARY OF THE INVENTION

The present invention relates to a method of making an ion-conductive article. An ion-conductive polymer is combined with a plastic-based matrix material. The resulting material is fabricated into an ion-conductive article.

The methods and articles of the present invention yield articles suitable for many applications heretofore impractical for articles made solely from a plastic base material, or a plastic base material incorporating an electron-conductive polymer by itself. For instance, ion-conductive polymer materials can be relatively inexpensively fabricated into relatively complex or intricate articles that offer improved protection and shielding from undesired consequences of occurrences of natural phenomena, such as lightning, or electromagnetic interference. Moreover, the articles of the present invention can be coated, using methods such as electrostatic coating methods, to achieve a relatively high quality surface finish.

DESCRIPTION OF THE DRAWINGS

FIG. 1 is a flow chart outlining the steps for making a coated article containing an ion-conductive polymer of the present invention.

FIG. 2 is an elevational view of a coated ion-conductive plastic matrix composite automotive body panel of the present invention.

FIG. 3 is a cross-sectional view taken through a coated article of the present invention.

DESCRIPTION OF THE PREFERRED EMBODIMENT

The ion-conductive materials of the present invention generally refer to ion-conductive polymers, blends and copolymers of ion-conductive polymers and non-ion conductive polymers, composites containing ion-conductive polymers, or mixtures thereof. The ion-conductive materials of the present invention comprise an effective amount of an electrically conductive ion in a base polymer material. The ion-conductive materials are suitable for use either singly, or in combination with other materials, in a number of applications.

By "effective amount", as used herein, is meant an amount of an electrically conductive ion sufficient to show a significant and reproducible improvement in one or more electro-conductive properties of an overall ion-conductive polymer composition. By "base polymer" as used herein, is meant a polymer material into which ions can be introduced, i.e., doped, to improve one or more of the electro-conductive properties of the overall ion-conductive material composition. By "ion-conductive composite material" as used herein is meant a composite material including a generally non-ion-conductive plastic-based matrix material and an ion-conductive polymer.

It will be appreciated that ion-conductive polymers are employed in the present methods and articles because of several advantages they exhibit over electron conductive polymers. Such advantages include, without limitation, a general resistance to oxidation and photochemical degradation, moderate conductivities, and relative ease of processing.

The conductive ions suitable for incorporation into polymers of the present invention are preferably those that can be readily doped into a base polymer material so that the base polymer material will intrinsically conduct electricity. Thus, the conductive ions may be anionic or cationic in nature, and may include monovalent, divalent, trivalent ions or mixtures thereof. More preferably, the conductive ions are ions obtainable from salt compounds, or like "ion-evolving" compounds, and are selected from the ions of elements listed in Groups I, II, III, V, VI, VII of the periodic table, or mixtures thereof. In a highly preferred embodiment, the ions doped into the base polymers of the present invention are cations that are doped in oxygen-containing base polymers. Still more preferably the dopant ions are ions of elements selected from the group consisting of lithium, sodium, potassium, or mixtures thereof.

Examples of suitable salt compounds which can be employed to dope ions into the base polymers of the present invention include, without limitation, $LiClO_4$, $LiCF_3SO_3$, $LiBF_4$, $LiPf_6$, $LiPbPO_4$, $LiCl$, $NaSCN$, $NaCF_3SO_3$, $NaBH_4$, $Na[B(C_6H_5)_4]$, $NaI$, $NaClO_4$, $NH_4CF_3SO_3$, $KSCN$, $KCF_3SO_3$, $RbCF_3SO_3$, $RbI$, $CsCF_3SO_3$, $Mg(ClO_4)_2$, or mixtures thereof.

Without intending to be bound by theory, to obtain the desired electrical conductivity characteristics by doping the present base polymers, it is preferred that the base polymer of the present invention is at least partially amorphous, generally polar (such as an oxygen containing polymer) and flexible. Also preferred is that the average molecular weight of such base polymer is in the range of about $10^3$ to about $10^6$. Still more preferably, the molecular weight is in the range of about $10^4$ to about $10^6$.

Thus, the preferred polymers for use in the present ion conductive polymers include poly (ethylene oxide) (PEO), oxymethylene-linked poly (ethylene oxide), poly (propylene oxide), poly ([2 -(2-methoxy ethoxy) ethoxy] phosphazene) (MEEP), poly (vinyl acetate), poly (acrylonitrile), and poly (diallyldimethyl (ammonium chloride)).

The preferred molar ratio for the doping of the ions such as cations, into the base polymer at least partially depends on the type of base polymer and the ion or ionic compound selected. For example, a ratio of about 8:1 of ethoxide oxygens to lithium ions is preferred for doping a PEO base polymer, and a ratio of about 16:1 is preferred for a MEEP base polymer. In general, however, the ions of the present invention are doped into the base polymer material in an amount of about 5% to about 30% (still more preferably about 10–20%) by weight ion of the total overall doped polymer composition.

In the present preferred embodiment, the ion-conductive polymer is a poly(ethylene oxide) polymer having a lithium cation dispersed therein. Preferably the lithium cation is present in an amount of about 10 percent by weight of the overall ion-conductive polymer composition.

The ion conductive polymers of the present invention may be made in any suitable manner. For instance, it is possible to dope the base polymer material with ions by dissolving an ionic salt in a polymer melt, or by introducing the ion using known methods such as ion bombardment. Alternatively, the ions may be introduced by wet doping methods, dry doping methods or mixtures thereof. The wet doping approach typically involves dissolving a desired ratio of an ionic salt and polymer in a suitable solvent (e.g. an organic solvent), and then evaporating the solvent. One will appreciate that the type of solvent employed will vary depending upon the base polymer and the ionic salt. This method is particularly useful for preparation of films wherein the solvent can be evaporated rather easily. Dry doping methods may also be employed to introduce ions into a polymer. This approach involves grinding an ionic salt and a base polymer together for a predetermined period of time. The resulting admixture can then be pelletized or otherwise processed into a useful doped polymer material.

Preferably, to make an ion-conductive polymer, such as a poly (ethylene oxide) polymer having a mobile cation therein, either the wet and/or dry doping methods are employed. A suitable method for dry doping of PEO with lithium ions is discussed in a paper by F. M. Gray, C. A. Vincent, and M. Kent, entitled "Dielectric Studies of Poly (Ethylene Oxide)-Based Polymer Electrolytes Using Time-Domain Spectroscopy", Solid State Ionics, 28–30, pp. 936–940 (1988), which is hereby expressly incorporated by reference. Wet doping of lithium ions in poly (propylene oxide) is discussed in a paper by M. Watanabe, K. Sanui, N. Ogata, T. Kobuyashi, and Z. Ohtaki, entitled "Ionic Conductivity and Mobility in Network Polymers from Poly (Propylene Oxide) containing Lithium Perchlorate", J. Appl. Phys., 57, pp. 123–128 (1985), which also is hereby expressly incorporated by reference. Further discussion of doping methods can be found in "Lithium Fast-Ion Conductors: Polymer-Based Materials", by J. Wasson, Office of Naval Research, contract N00014-83-C-0440, Final Report, May 30, 1987, which is hereby expressly incorporated by reference.

The ion-conductive polymers of the present invention may then be fabricated into useful articles using known methods such as are commonly employed for polymers of the type such as the base polymers. For instance, the ion-conductive polymers can be fabricated into molded components (e.g. by suitable compression or injection molding methods), cast as thin films, applied to a surface as a coating or a laminate, prepared for use in a composite material, or the like. Also, the ion conductive polymers of the present invention can be processed into useful articles using methods described in *Introduction to Polymer Science and Technology: An SPE Textbook*, by H. S. Kaufman and J. J. Falcetta (1977), and *McGraw-Hill Encyclopedia of Science & Technology*, Vol. 14, pp. 35–40 (1987), which are hereby expressly incorporated by reference.

In a highly preferred embodiment of the present invention, an ion-conductive polymer is combined with a second material to form an ion-conductive composite material. The ion-conductive composite material can then be fabricated into an ion-conductive article.

For the preferred composites of the present invention, an ion-conductive polymer (such as described above) is disbursed or otherwise distributed in a generally non-conductive plastic matrix material. Preferably the generally non-conductive plastic matrix material has enhanced properties including enhanced mechanical properties, as compared with the ion-conductive polymer by itself. Thus, the resulting composite material exhibits improved properties (such as mechanical properties) as compared with the ion-conductive polymer alone; and improved electro-conductive properties, as compared with the plastic matrix material alone. The generally non-conductive plastic matrix material may, itself, by an unreinforced polymer material or it may be a composite material such as one including a reinforcement material. Preferably, the generally non-conductive matrix material is a plastic matrix composite material such as, without limitation, those disclosed in the *McGraw-Hill Encyclopedia of Science and Technology*, Vol. 14, pp. 142–144 (1987), which is hereby expressly incorporated by reference.

Accordingly, the ion-conductive composites of the present invention contain, without limitation, a thermoplastic material, a thermosetting material, or mixtures thereof.

Preferably, the present ion-conductive polymers may be incorporated into relatively high strength plastic matrix materials such as those including, without limitation, high temperature amorphous resin, high strength thermoplastic polyimide, bismaleimide, epoxy, polybenzimidazole, polyetherether ketone, polyphenylene sulfide, polyamides, polycarbonate, acetal, styrene-maleic anhydride, polybutylene terephthelate, thermoplastic polyester elastomer, thermoplastic polyurethane, phenolic, nylon, melamine, polyurethane resins, polyethylene terephthelate, polyethylene, polypropylene, polyphenylene sulfide, polystyrene, polyamide-imide, polyarylate, polyaryl sulfone, polyetherimide, polyester polysulfone blends, or mixtures thereof.

Alternatively, the ion-conductive polymers may be incorporated into a generally non-ion-conductive plastic matrix material such as those including, without limitation, polyvinyl chloride, polyvinylidene chloride, polymethyl methacrylate, polyacrylonitrile, polytetrafluoroethylene, or mixtures thereof.

The ion-conductive polymer can be incorporated into or combined with the generally non-conductive plastic matrix material in a variety of forms depending upon the conductivity desired for a particular application. For instance, the ion-conductive polymers may be incorporated as a sheet, rod, plate, bar, flake, continuous fiber, chopped fiber, foam, mat, unwoven, woven, strand, roving or mixtures thereof. Likewise, the ion-conductive polymer may be provided as a generally uniformly arranged pre-formed configuration, or it may be randomly distributed throughout the composite material. Thus, the directional electrical conductivity properties of the resulting material may be controlled by the selection of a particular form or configuration of ion-conductive polymer.

Preferably, care should be taken to preserve the form of the ion-conductive polymer when incorporating it into or combining it with the generally non-conductive plastic matrix material. For instance, the dimensional characteristics of the ion-conductive polymer (such as the aspect ratio of a fiber) may contribute to its electrical conductivity characteristics. Thus, the ion-conductive polymer should be introduced preferably at a stage of processing and in a manner to help avoid polymer breakage or damage (e.g. by using relatively low shear equipment and/or by minimizing the distance over which the fiber must be handled prior to fabricating the ultimate article).

The composite materials of the present invention may further incorporate additional reinforcement material such as a metal, graphite, ceramic or polymer reinforcement. Examples of preferred reinforcement materials (such as fibers) include, without limitation, glass, carbon, boron, polyaramid, and the like which are added for improved mechanical or physical properties. Also, suitable known additives such as fillers, thickeners, release agents, catalysts, flame retardants, additives for maintaining dimensional stability of an article and the like may be incorporated into the present materials to improve the properties thereof, as is customary in the art.

Preferably the ion-conductive polymer is present in a weight percent of up to about 60% of the overall composite. More preferably, the ion-conductive polymer is present in an amount of about 40 to about 60% weight percent of the overall composite. It will be appreciated, however, that this number may be higher or lower depending on the particular application. For instance, it is possible that the ion-conductive polymer composites of the present invention may be incorporated into one or more additional materials, such as by selectively dispersing or distributing a first conductive composite already containing an ion-conductive polymer, in a second material. Relatively precise selective control over the resulting electrical properties of the composite material is thus obtainable.

In a preferred embodiment, a composite incorporating an ion-conductive polymer is prepared. The composite can be prepared according to known methods for preparation of plastic matrix composite materials (with the provision, of course, for the incorporation of the conductive polymers of the present invention) such as those disclosed in the *McGraw Hill Encyclopedia of Science and Technology,* Vol. 14, pp. 35–39 (1987). For instance, known sheet molding compound or pultrusion methods may be employed, or reaction injection molding methods may alternatively be employed. Where the ion-conductive polymer is incorporated into or combined with a sheet molding compound, the article may be compression molded according to known methods such as are disclosed in U.S. Pat. No. 4,612,149 issued Sep. 16, 1986 (Iseler et al) which is hereby expressly incorporated by reference.

Alternatively, an ion conductive polymer can be copolymerized to form a copolymer material with one or more additional generally non-ion-conductive polymer materials such as polyamide (nylon), polyester (such as aliphatic polyester), poly (acrylonitrile-butadiene-styrene), epoxy, polyimide, polyetheretherketone, polyether sulfone or mixtures thereof.

For instance, it is contemplated that a copolymer material may include one or more copolymers of the type including random, alternating, block, and graft copolymers. Suitable methods for effectuating copolymerization, such as suspension copolymerization or block copolymerization, include those discussed in *Textbook of Polymer Science,* by F. W. Billmeyer, Jr. (2nd ed. 1971), which is hereby expressly incorporated by reference.

Referring to FIG. 1, in a highly preferred embodiment, a conductive article that is coated with a protective and/or decorative coating is prepared using the methods of the present invention. More particularly, as shown in steps 1 to 3 of FIG. 1, a conductive article is prepared. An ion-conductive polymer is provided. A charge material is formed that contains the ion-conductive polymer. By "charge material" as used herein, is meant a mass of material that exists in a form suitable for fabrication into an ultimate article. The charge material is then fabricated into an ion-conductive article that includes the ion-conductive polymer.

According to step 4 of FIG. 1, the ion-conductive article can be coated using known methods and compositions for obtaining a protective and/or decorative coating. For example, without limitation, the articles of the present invention may be coated with water-based or organic-based compositions, compositions containing additives such as metal flakes, or the like. Coating may be accomplished using methods such as rolling, spraying, dipping, brush coating or the like. In an even more preferred embodiment, the article is electrostatically coated. In this regard, preferably the ion-conductive article is used as a conductive substrate for accomplishing an improved electrostatic coating finish (without the need for a conductive primer), on a major surface of the ion-conductive article.

The improved electrostatic coating finish is believed to be at least partially due to the conductive characteristics, i.e. the charge-carrying capability, of the ion-conductive article. It is believed that this step of coating the present ion-conductive articles contributes to expanding the field of useful applications for some ion-conductive materials which, when uncoated, tend to be sensitive to moisture.

In a highly preferred embodiment the ion-conductive polymers of the present invention are introduced into an uncured resinous polyester molding composition, such as the sheet molding compounds disclosed in U.S. Pat. No. 4,622,354 issued Nov. 11, 1986 (Iseler et al) which is hereby expressly incorporated by reference. Preferably the ion-conductive polymer is introduced prior to ultimately curing the sheet molding compound. Thus, it is contemplated that the ion-conductive polymer may be copolymerized with the resinous polyester molding composition. A charge material is formed that includes the ion-conductive polymer and the sheet molding compound. The charge material is molded under suitable pressure and temperature conditions. The charge material, particularly the sheet molding compound, is allowed to cure. The resulting molded article can then be coated.

The ion-conductive materials of the present invention are useful in a variety of applications, particularly those requiring relatively lightweight, generally noncorrosive, and electrically-conductive materials.

For instance, particularly attractive uses of the present materials include without limitation, panels for transportation vehicles such as naval craft, and land transportation vehicles such as automobiles, locomotives, busses, trucks and the like. For instance, as shown in FIG. 2 an automotive vehicle body panel 10, and particularly a body panel 10 having an electrostatically applied coating, may be prepared according to the methods of the present invention. Typical body panels within the scope of the present invention include without limitation, doors, hoods, roofs, quarter panels, and deck lids. As seen in FIG. 3, a coating 12 is applied to a major surface 14 of a composite article. A matrix 16 of the composite article may incorporate an ion-conductive polymer 18 (shown as having been formed into a fiberous material using known fiber forming methods) and a suitable reinforcing material 20.

The present materials may further be employed in a variety of other applications, particularly where the article is electrostatically coated, and improved surface finish from electrostatic coating methods is desired. For instance, without limitation, panels incorporating the present ion-conductive polymers may be manufactured for construction materials, appliances, flooring, business machines, housings for electronics, or the like.

Although the invention has been described with particular reference to certain preferred embodiments thereof, variations and modifications can be effected within the spirit and scope of the following claims.

What is claimed is:

1. A method of preparing an ion-conductive structural member or panel, said method comprising the steps of:
   (a) doping a base polymer with ions to form an ion-conductive polymer;
   (b) mixing said ion-conductive polymer and a non-ion-conductive polymer to form a composite charge material;
   (c) fabricating said charge material into an ion-conductive member or panel; and
   (d) electrostatically coating said member or panel.

2. The method of claim 1 wherein said providing step (a) includes doping a base polymer with a compound capable of evolving ions.

3. The method of claim 2 wherein said compound is an ionic salt compound.

4. The method of claim 2 wherein said base polymer is selected from the group consisting of poly (ethylene oxide), poly (propylene oxide), poly ([2 -(2-methoxy ethoxy) ethoxy] phosphazene), poly (vinyl acetate), poly (acrylonitrile), poly (diallyldimethy (ammonium chloride)), and mixtures thereof.

5. The method of claim 1 wherein said ion-conductive polymer is poly (ethylene oxide) doped with an effective amount of a cation of an element selected from the group consisting of sodium, lithium, potassium and mixtures thereof.

6. The method of claim 1 wherein said fabricating step (c) includes molding said charge material into an automotive body panel.

7. The method of claim 1 wherein said providing step (a) includes providing an ion-conductive polymer that is copolymerized with a polymer selected from polyamide, polyester, poly (acrylonitrile-butadiene-styrene), epoxy, polyimide, polyetheretherketone, polyether sulfone, or mixtures thereof.

8. A method of preparing an ion-conductive composite structural member or panel, said method comprising the steps of:
   (a) providing an ion-conductive polymer;
   (b) forming a composite charge material including said ion-conductive polymer and a reinforced plastic-based matrix material;
   (c) molding said composite charge material into an ion-conductive composite member or panel; and
   (d) electrostatically coating said member or panel.

9. The method of claim 8 wherein said providing step (a) includes doping a base polymer with a compound capable of evolving ions.

10. The method of claim 9 wherein said base polymer is selected from the group consisting of poly (ethylene oxide), poly (propylene oxide), poly ([2 -(2-methoxy ethoxy) ethoxy] phosphazene), poly (vinyl acetate), poly (acrylonitrile), poly (diallyldimethy (ammonium chloride)), and mixtures thereof.

11. The method of claim 8 wherein said ion-conductive polymer is poly (ethylene oxide) doped with an effective amount of a cation of an element selected from the group consisting of sodium, lithium, potassium and mixtures thereof.

12. The method of claim 8 wherein said molding step (c) includes molding said charge material into an automotive body panel.

13. A method of preparing an ion-conductive composite automotive body panel, said method comprising the steps of:
   (a) doping a poly (ethylene oxide) polymer with an effective amount of an ion of an element selected from the group consisting of sodium, lithium, potassium, and mixtures thereof to form an ion-conductive doped poly (ethylene oxide) polymer;
   (b) combining said doped poly (ethylene oxide) polymer with an uncured resinous polyester molding compound composition to form a charge material;
   (c) molding said charge material to form an automotive body panel;
   (d) curing said charge material; and
   (e) electrostatically coating said panel.

14. The method of claim 13 wherein said combining step (b) includes adding said doped poly (ethylene oxide) polymer in an amount up to about 60% of the overall charge material composition.

15. The method of claim 13 said doping step (a) includes a step of forming a fibrous material from said doped only (ethylene oxide) polymer.

16. The method of claim 13 wherein said combining step (b) includes copolymerizing said doped poly (ethylene oxide) with said resinous polyester molding compound.

17. The method of claim 13 wherein said doping step (a) includes doping said poly (ethylene oxide) polymer with a lithium ion in an amount equal to about 10% to about 20% by weight of the ion-conductive polymer.

* * * * *